United States Patent [19]

Yamane

[11] Patent Number: 4,993,461
[45] Date of Patent: Feb. 19, 1991

[54] CHLOROFLUOROCARBON RECOVERY DEVICE

[75] Inventor: Makoto Yamane, Yamaguchi, Japan

[73] Assignee: Taisei Kabushiki Kaisha, Tokyo, Japan

[21] Appl. No.: 437,829

[22] Filed: Nov. 16, 1989

Related U.S. Application Data

[63] Continuation-in-part of Ser. No. 275,426, Nov. 23, 1988, abandoned.

[30] Foreign Application Priority Data

Feb. 4, 1988 [JP] Japan .................................. 63-14375

[51] Int. Cl.$^5$ ............................................ F25B 45/00
[52] U.S. Cl. ...................................... 141/231; 141/65; 141/82; 141/98; 280/47.034; 62/55.5; 62/149
[58] Field of Search .................... 141/7, 65, 82, 83, 98, 141/231; 280/47.34; 62/55, 149, 174

[56] References Cited

U.S. PATENT DOCUMENTS

| | | | |
|---|---|---|---|
| 3,232,070 | 2/1966 | Spanano | 62/149 |
| 3,873,789 | 3/1975 | White | 62/149 |
| 3,875,755 | 4/1975 | Anderson et al. | 62/149 X |
| 4,010,623 | 3/1977 | Kaschak | 62/50.1 |
| 4,222,145 | 9/1980 | Lowder | 280/47.74 X |
| 4,441,330 | 4/1984 | Lower et al. | 62/149 |
| 4,495,777 | 1/1985 | Babington | 62/179 |
| 4,556,091 | 12/1985 | Poulsen | 141/82 |
| 4,621,112 | 11/1986 | Proctor | 62/149 |
| 4,766,733 | 8/1988 | Scuderi | 62/149 X |
| 4,768,347 | 9/1988 | Manz et al. | 62/149 |
| 4,809,515 | 3/1989 | Houwink | 62/149 |

Primary Examiner—Ernest G. Cusick
Attorney, Agent, or Firm—Koda and Androlia

[57] ABSTRACT

A chlorofluorocarbon recovery device including a compressor, condenser and gas recovery container which are sequentially linked by ducts for recovering and recycling chlorofluorocarbon in the refrigerants which were conventionally dissipated in the atmosphere and ignored at the time of repair or destruction of air-conditioners in used automobiles or other air-conditioning equipment, refrigerators, or the like, and also preventing adverse effects on life on earth (the global environment) due to dissipation into the atmosphere.

7 Claims, 2 Drawing Sheets

4,993,461

CHLOROFLUOROCARBON RECOVERY DEVICE

This is a continuation-in-part application of Ser. No. 275,426, filed Nov. 23, 1988, now abandoned.

BACKGROUND OF THE INVENTION

1. Field of the Invention

This invention relates to a chlorofluorocarbon recovery device for recovering and recycling chlorofluorocarbon (also known by the trade name "Freon") widely used as coolant for automobile coolers and various cooling and refrigerating machines, while avoiding dissipation of the chlorofluorocarbon into the atmosphere during automobile cooler repair or destruction.

2. Prior Art

Chlorofluorocarbon are low in toxicity, odorless and harmless, are free from combustibility and chemical instability, are excellent in electric insulation, relatively non-corrosive in the absence of moisture, and extremely safe; hence, they are widely used as coolant for cooling machines and refrigerators. Additionally, they are widely used for spray propellants and in various cleaning agents, and their production is rapidly increasing. Global production of chlorofluorocarbon has exceeded one million tons and continues to increase.

High concentrations of chlorofluorocarbon tend to dissipate into the atmosphere at the time of repair and demolition of automobiles, air conditioners, and refrigerators. For example, with respect to automobile air conditioners, in Japan, about 6 million cars are destroyed each year, and about 80 percent of them are equipped with air conditioners; each air-conditioned car contains about 1 kg of chlorofluorocarbon, which means a total of nearly 5,000 tons. They dissipate into the air and cannot be recovered when the piping is cut off. A similar situation occurs in the repair and destruction of other air conditioning machines and refrigerators, not only in Japan but also in other nations; hence, the total amount of chlorofluorocarbon lost to the atmosphere from the entire world is tremendous. When such a huge volume of chlorofluorocarbon continues to be released every year, the chlorofluorocarbon climb up through the atmosphere to reach the stratosphere, where they are decomposed by short wavelength ultraviolet rays and other reaction substances to form oxides. The ozonosphere, which normally prevents the ultraviolet rays from penetrating the atmosphere, is destroyed by these oxides. Thus, the quantity of ultraviolet rays reaching the earth's surface increases, which may adversely affect all of the earth's organisms, including humans, and may also bring about drastic changes in the weather and climate, as many scientists forewarn. This is a serious environmental problem.

SUMMARY OF THE INVENTION

It is hence a primary object of this invention to present a chlorofluorocarbon recovery device which is convenient for use and capable of recovering and recycling, without further processing, chlorofluorocarbon, which previously dissipated into the atmosphere to adversely affect the earth seriously at the time of repair or destruction of automobiles and air conditioning machines and refrigerators, so as to prevent the destruction of the earth's environment.

It is another object of the present invention to provide a recovery device which is low in maintenance.

Accordingly, in the present invention, a compressor equipped with a suction passage and pressure gauge and driven by a power source, a condenser with a cooling fan for condensing chlorofluorocarbon, and a recovery gas container for storing the condensed chlorofluorocarbon are sequentially linked by ducts to make up a chlorofluorocarbon recovery device.

Also presented is a mobile chlorofluorocarbon recovery device having wheels and a handle for pushing by hand attached to the chlorofluorocarbon recovery device.

Further presented is a chlorofluorocarbon recovery device having an oil separator, check valve and thermoswitch provided at proper positions of the suction passage or ducts of the chlorofluorocarbon recovery device.

DETAILED DESCRIPTION OF THE INVENTION

This invention relates to a device for recovering chlorofluorocarbon from automobile air conditioners, and various air conditioning machines and refrigerators, and some of the preferred embodiments are described below, referring to the accompanying drawings.

Figure 1:
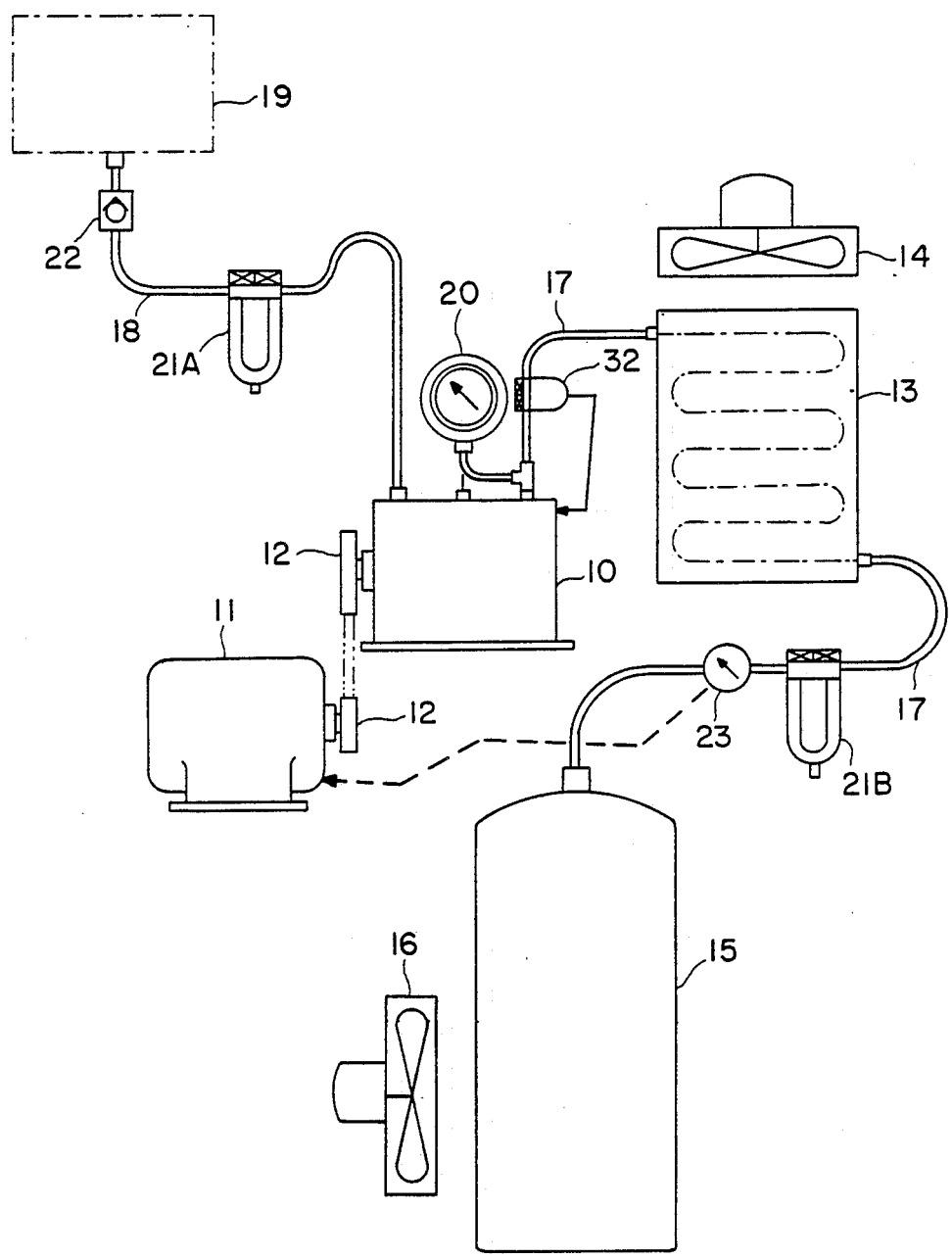
FIG. 1 is an outline drawing showing a basic construction of the chlorofluorocarbon recovery device of this invention.

A basic composition of this invention is explained on the basis of FIG. 1.

A compressor 10 is furnished with a motor 11 for driving and a speed change pulley 12. As for the motor 11, one having a capacity of 1.5 kW to 5.5 kW may be used, but the 2.2 kW motor is recommended. By the speed change pulley 12, the compressor 10 is adjusted to a proper rotating speed (for example, 2,000 rpm).

Numeral 13 is a condenser having a cooling fan 14; while the chlorofluorocarbon gas passes through an isolated long passage, it is cooled by the cooling fan 14 and condenses.

A cylindrical gas recovery container 15 has a cooling fan 16 which is external to and cools the gas recovery container 15 to help liquefy the gas in the container 15.

A duct 17 sequentially links the compressor 10, condenser 13 and gas recovery container 15, forming a passage to send the chlorofluorocarbon compressed by the compressor 10 into the gas recovery container 15 by way of the condenser 13.

Numeral 18 is a suction passage, and one end thereof is linked to the compressor 10 and the other end to a cooler 19 or the like of refrigerator or air conditioner of a car for sucking the chlorofluorocarbon in the cooler 19 into the compressor 10. An accumulator 21A is provided in suction passage 18 adjacent to the input of compressor 10 reducing the load on compressor 10.

An oil separator 21B is installed in duct 17 linking the condenser 13 and gas recovery container 15, and is used to filter and remove any oil mixed in with the gas.

Numeral 22 is a check valve, which is installed in the suction passage 18 and prevents counterflow of gas in this passage 18.

Numeral 23 is a thermo-switch, which is located in the duct 17 between the condenser 13 and gas recovery container 15, and detects the temperature of chlorofluorocarbon passing through this duct 17. When the gas temperature reaches a specified point (for example, 20° C.), it is regarded to indicate lack of condensation, and the motor 11 which drives the compressor 10 is shut off by thermo-switch 23 so as to allow time for the gas to cool. When the thermo-switch 23 determines that the gas temperature is such that the gas has sufficiently cooled, the motor 11 is engaged to drive the compressor 10 once again. Numeral 32 is an oil separator which separates oil from the gas and supplies the oil to the oil lubrication input port of the compressor 10 to provide good lubrication for and extend the life of the compressor 10 and reduce the maintenance thereof.

Figure 2:
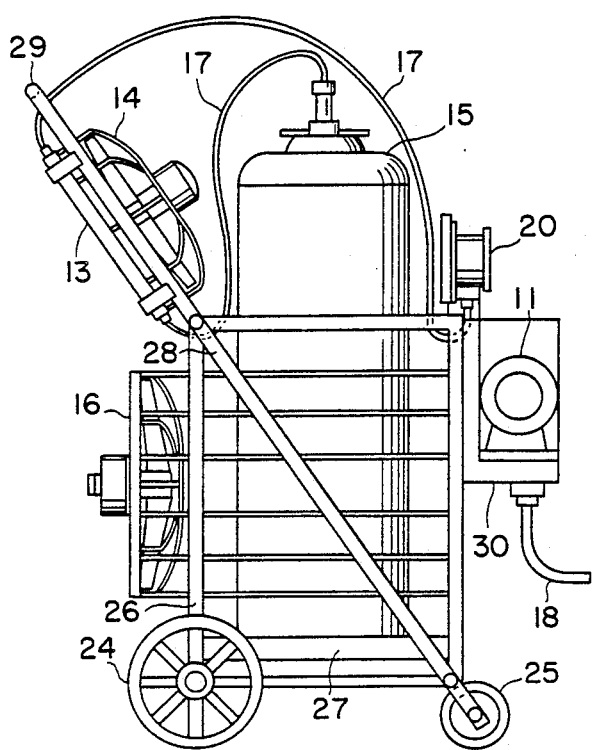
FIG. 2 is a side view of a hand-pushed structure with wheels allowing for mobility of the chlorofluorocarbon recovery device of this invention.
Figure 3:
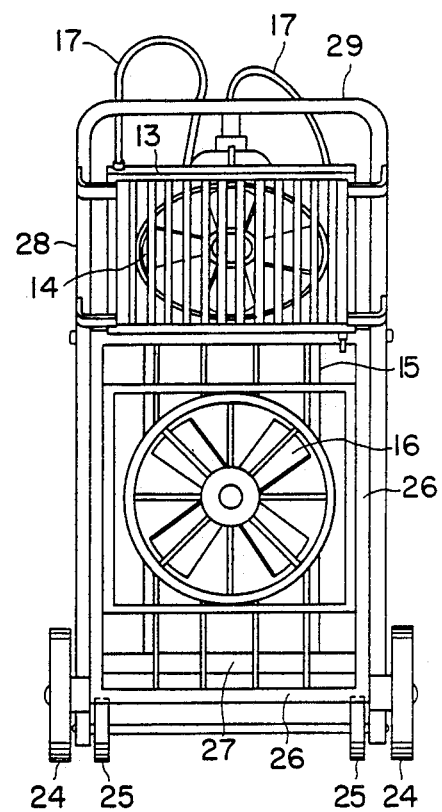
FIG. 3 is a front view thereof.
Figure 4:
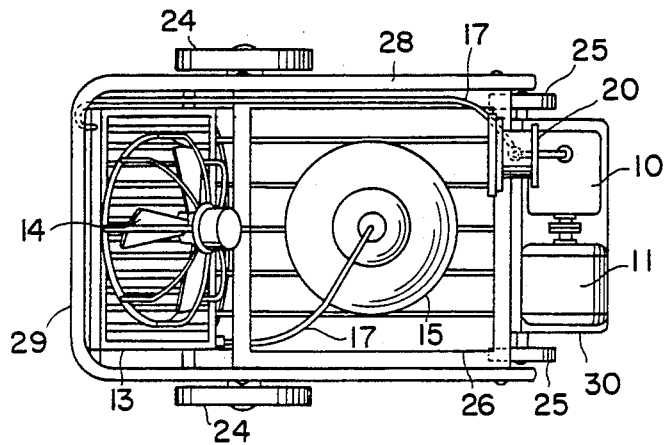
FIG. 4 is a plan view thereof.

FIGS. 2, 3 and 4 show an example of a hand-pushed mobile type of chlorofluorocarbon recovery device including wheels 24, 25 and handle 29, compactly assembling the chlorofluorocarbon recovery device shown in FIG. 1, and this example is explained hereinafter.

Frame 26 is an upright frame, and a bed plate 27 is integrally affixed to the bottom of the frame 26. At both sides of this frame 26, a handle arm 28 is fitted from the front lower end obliquely to the rear side on the diagonal line. The end standing obliquely behind the handle arm 28 is bent laterally to form a handle 29 in continuity with the right and left handle arms 28.

A pair of wheels 24 is rotatably mounted at either side of the lower rear end of the frame 26, and another pair of wheels 25 smaller in diameter than the wheels 24 is similarly rotatably mounted at the lower end of the handle arms 28 positioned at either side of the lower front end of the frame 26, thereby forming four wheels together with the wheels 24.

On the bed plate 27, the cylindrical gas recovery container 15 is set upright inside the frame 26. At the front part of the frame 26, the compressor 10 having a pressure gauge 20 and being supported by an L-shaped bracket 30 and the motor 11 for driving this compressor 10 are installed. Furthermore, a cooling fan 16 for cooling the gas recovery container 15 from the side is installed behind the frame 26.

Moreover, at the obliquely projecting part rearward and upward from the frame 26 of the handle arm 28, the condenser 13 is mounted together with the integrally installed cooling fan 14. In the drawing, numeral 17 denotes a duct and 18 is a suction passage. Oil separator 21, check valve 22 and thermoswitch 23 installed in the duct 17 and suction passage 18 and are omitted in these FIGS. 2, 3 and 4. Additionally, the power switch and cord have also been omitted for the sake of simplicity.

Thus composed chlorofluorocarbon recovery device is pushed by hand and moved close to the object housing the chlorofluorocarbon to be recovered, such as a used car, and the suction passage 18 is connected to the cooler 19, and then the compressor 10 is started up. As a result, the compressor 10 sucks and compresses the gas in the cooler 19 and discharges into the duct 17. Thus compressed gas is heated to 50 to 60 C, and is sent into the condenser 13, in which it is cooled by the cooling fan 14 to cause it to condense and liquefy, and then it is sent into the gas recovery container 15 by way of the duct 17.

In the present invention, if the condensing capacity of the condenser 13 is insufficient for the discharge of the compressor 10 and the level of cooling is not adequate, the temperature of chlorofluorocarbon gas passing through the condenser 10 is detected by the thermo-switch 23, and if the temperature is over a specified temperature (for example, 20° C.), an OFF command is issued to the motor 11, and the action of the compressor 10 is stopped, halting the blowing-out of gas, thereby promoting condensation within the condenser 13. When the gas temperature is lowered, its temperature is detected again by the thermo-switch 23 and the compressor 10 is reactivated. Meanwhile, the gas recovery container 15 is also cooled by the cooling fan 16, and liquification of the gas is accelerated.

In addition, oil separators 21 B and 32 are installed in the duct 17, and the oil contained in the gas is filtered out in order to purify the recovered chlorofluorocarbon.

According to the chlorofluorocarbon recovery device of the present invention as explained herein, the chlorofluorocarbon used as a coolant, which conventionally would dissipate into the atmosphere at the time of repair or destruction of automobile air conditioners, general cooling machines and refrigerators, can be easily recovered and recycled without further processing, which is economically advantageous. Furthermore, by eliminating dissipation of chlorofluorocarbon into the atmosphere, the present invention can prevent the adverse effects chlorofluorocarbon has previously had on the ozone layer and global climate.

Herein, particularly preferred embodiments of the present invention are illustrated, but other modifications and changes can be made by those skilled in the art without departing from the true spirit and scope of the invention as claimed.

I claim:

1. A-hand-pushed mobile chlorofluorocarbon gas recovery device adapted for recovering and recycling chlorofluorocarbon gas from a refrigeration apparatus, said device comprising:

a frame;

a pushing handle provided on said frame;

wheels provided on said frame;

a suction input means for being coupled to said refrigeration apparatus;

an accumulator provided on said frame and having an input and an output and having its input coupled to said suction input means;

a compressor provided on said frame and having a drive unit and an input and an output with the input thereof being coupled to the output of said accumulator;

a condenser having an oil lubrication input port provided on said frame and having a cooling fan and an input and an output with the input thereof being coupled to the output of said compressor;

a first oil separator provided between said output of said compressor and said input of said condenser, said first oil separator for separating oil from said gas and for supplying said separated oil to said oil lubrication input port of said compressor;

a thermal-switch means coupled to said drive unit for sensing a temperature of the output from said condenser and for turning off said drive unit when said temperature exceeds a predetermined temperature;

a second oil separator provided on said frame and having an input and an output and having its input coupled to said output of said condenser;

a gas recovery container provided on said frame and coupled to the output of said second oil separator; and a cooling fan provided on said frame adjacent said recovery container for cooling said recovery container and accelerating liquification of said chlorofluorocarbon gas.

2. A hand-pushed mobile chlorofluorocarbon gas recovery device according to claim 1, wherein said wheels comprise two pair of wheels with one pair of wheels being provided in a rear portion of said frame and another pair being provided in a front portion of said frame and wherein said another pair of wheels in said front portion are smaller in diameter than said one pair in said rear portion.

3. A chlorofluorocarbon recovery device according to claim 2, wherein said gas recovery container is mounted upright on a bed plate coupled to said frame, said compressor with drive unit and said cooling fan for the gas recovery container are mounted on said frame, and said condenser with cooling fan is attached to the pushing handle.

4. A chlorofluorocarbon recovery device according to claim 1, wherein the drive unit of said compressor consists of a motor and is capable of changing speed of compression.

5. A chlorofluorocarbon recovery device according to claim 1, wherein a pressure gauge indicating the discharge pressure is attached to said compressor.

6. A chlorofluorocarbon recovery device according to claim 5, wherein a check valve is provided between said suction input means and said input of said accumulator.

7. A chlorofluorocarbon recovery device according to claim 1, wherein said gas recovery container is a cylindrical container.

* * * * *